Sept. 11, 1928.
E. A. BAKER
GUARD CAGE
Filed Aug. 6, 1927
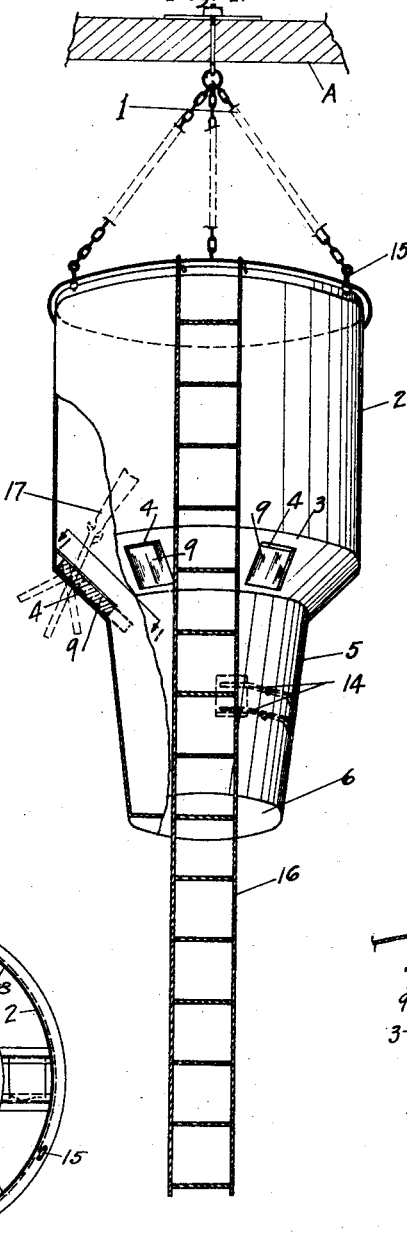
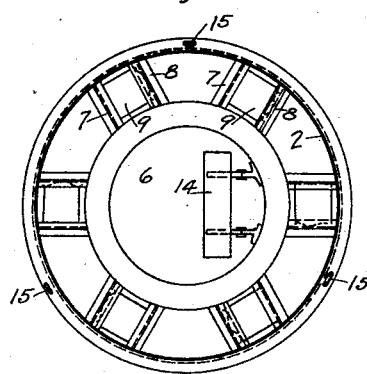
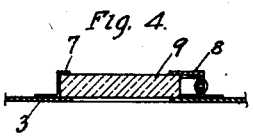
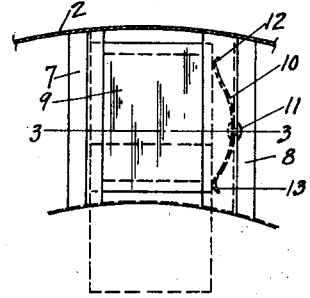
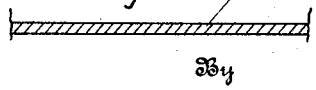

Patented Sept. 11, 1928.

1,684,122

UNITED STATES PATENT OFFICE.

EDWARD A. BAKER, OF MANSFIELD, OHIO.

GUARD CAGE.

Application filed August 6, 1927. Serial No. 211,199.

This invention relates to a guard cage.

It is well-known that in banks, financial institutions or the like where money or securities are used or handled that the same are liable to be stolen by bandits or robbers; that the employees of such institutions are in imminent danger of being injured or killed at such times because it is very difficult and dangerous for the employees to protect the funds or make any effort to protect themselves from being injured or killed.

The primary object of the present invention therefore, is to provide means for protecting a guard and the employees of bank institutions or the like from injury or death at the hands of robbers or bandits and at the same time provide means for permitting the guard to injure or kill the bandits or robbers without danger or exposure of himself to injury or death or the liability of injuring others.

Another object of the present invention is to provide a guard cage with transparent means through which he can see any one who enters the bank or is in the bank from any angular relation or position in the cage and at the same time to see and to direct his aim and shoot accurately at any angle with respect to the cage at any one in the bank or who enters the bank for a wrongful purpose such as robbing the bank.

A further object is to so construct a guard cage that the guard while in the cage can see and direct his aim and shoot directly underneath, surrounding or in close proximity to the cage from any position in the cage or at any angular relation thereto.

A further object of the present invention it to provide transparent means for closing or partially closing openings formed in the cage through which a fire arm may be projected, so that the guard may direct and aim to shoot accurately toward any part of the room or structure in which the cage is installed without exposing or endangering his own safety in so doing.

These and other objects are attained by the construction of a guard cage such as illustrated in the accompanying drawing in which:—

Fig. 1 is a perspective view of a cage constructed in accordance with my invention partially broken away and showing one of the openings in the cage in full lines closed by the slidable member and in dotted lines partially open with a fire arm passing through the opening with the barrel of the fire arm shown in different angular relations to the cage.

Fig. 2 is a plan view of the cage showing a plurality of openings provided in the cage with the slidable members in closed positions.

Fig. 3 is an enlarged view taken on the line 1—1 of Fig. 1 showing the opening closed by a slidable member and the slidable member moved to partially uncover the opening in dotted lines.

Fig. 4 is a cross sectional view taken on the line 3—3 of Fig. 3.

Fig. 5 is a sectional view of a floor or the like showing its preferred relation to the cage.

Reference letter A represents a beam within an inclosure of any kind such as a banking institution or the like and B the floor thereof in which the guard cage is installed and preferably hung from suitable tripod hanging means such as indicated by reference numeral 1.

In the drawings the preferable embodiment of the invention is shown and is constructed as follows:

The main body portion or shell 2 of the cage is preferably made circular in form and of uniform diameter. A flared hollow ring 3 is attached to the bottom of the shell 2 at its largest diameter by welding or by any other well-known fastening means.

The flared ring 3 is provided with a plurality of openings 4 which are located in spaced relation to each other around the circumference of ring 2. An inverted truncated hollow cone 5 is attached to the smallest diameter of the ring 3 and is closed at the bottom by a plate 6 or the like.

It will be noted that the construction described provides a cage that gives ample room for the guard, open at the top and having lower portion thereof gradually tapered downward toward the axis of the cage. Adjacent to the openings 4 Z-shaped bracket cleats 7 and 8 are provided and secured to the flared ring 3.

The upper ends of the bracket cleats 7 and 8 extend in opposed relation to each other and overlap the top of a slidable member 9 which is preferably made of transparent material to guide and maintain the sliding member in yielding adjustable position. The slidable members are adapted to be moved to entirely close the openings in the flared ring or leave same partially open as desired.

To maintain the slidable member in any adjusted position desired a yielding spring 10 is provided and preferably fastened at the center thereof by a rivet 11 which is secured to the bracket 8 leaving the ends 12 and 13 contacting with the side of the transparent slidable member under yielding tension and holding the slidable member in any adjusted position.

A seat for the guard is represented by reference numeral 14. The entire cage is preferably hung from a ceiling by the tripod hanging means which is attached to the shell 2 of the cage by eye bolts 15. A rope ladder or the like 16 is removably attached at its upper portion of the shell to provide means for the guard to enter or leave the cage.

In Fig. 1 a fire arm 17 is shown in dotted lines passing through one of the openings with the barrel of the fire arm shown in different related or angular positions to the cage to permit the guard to aim and shoot at any desired angle or position with respect to the cage. Reference letter B indicates the top of a floor or the like.

It will be observed that the sliding member when made of transparent material permits the guard to view the premises surrounding the cage while at the time time manipulating the firm arm so as to accurately pick, aim at, cover or shoot the person who is robbing the bank without being compelled to shoot blindly through an opening in the cage which is partially closed by the barrel of the fire arm.

It will be observed that the guard within the cage can shoot in any direction around the cage and that the sliding members being preferably made of bullet proof glass or the like protects him from being injured or killed by the robbers or bandits and further that all openings in the cage can be closed by the transparent slidable members and only one left partially open, to permit the barrel of the fire arm to be moved in any direction or angular position with respect to the cage and to aim at any particular person within the enclosure in which the cage may be installed.

It will be also observed that the construction of a cage as shown permits the guard to aim and shoot in close proximity to the cage without making it necesary to provide openings in the bottom of the cage.

The drawing shows the application of one form of cage to my invention, but it is not intended to limit the invention to the construction shown in the drawing.

Attention is further called to the fact that the cage can be covered to correspond with the interior finish of the banking institution if desired and that the cage is of simple construction requring a minimum amount of material or labor in constructing and installing same.

I claim:

1. In a guard cage, an upper hollow section of uniform diameter, an intermediate flared ring section inclined inwardly from the upper section secured thereto and having a plurality of openings formed therein and a lower inverted truncated cone secured to the flared intermediate section as described.

2. In a guard cage, an upper hollow section of uniform diameter, an intermediate section inclined inwardly from the upper section secured to the upper section and having a plurality of openings formed therein, means secured to the intermediate section to close or partially close the openings therein and a lower tapered section secured to and inclined inwardly and downwardly from the intermediate section.

3. In a guard cage, an upper section of uniform diameter, an intermediate section secured to the upper section and inclined inwardly therefrom and also having a plurality of openings formed therein, transparent means to close or partially close the openings secured to the intermediate section and a tapered lower section secured to the intermediate section and inclined inwardly and downwardly therefrom.

4. In a guard cage, an upper section of uniform diameter, an intermediate overhanging section having a series of openings therein secured thereto to command a view of the area beneath or surrounding the cage, slidable transparent means to fully or partially close said openings adjustably secured to the intermediate section, whereby a view can be had surrounding the cage and which at the same time afford means for inserting a fire arm in said openings for the purpose intended.

5. In a guard cage, an inclosure made of sections, one being of substantially the same diameter adjacent to its top and having intermediate and lower sections which incline from the upper section to the bottom of the inclosure, the intermediate section having openings formed therein and slidable means to close or partially close said openings to permit a fire arm to be projected through an opening for the purpose intended.

6. In a guard cage, a tubular member of uniform diameter in combination with two inclined tubular members all secured together, one of the last mentioned members being arranged in overhanging relation to the other and provided with a plurality of openings and having transparent slidable adjustable means secured to the overhanging member which has openings provided therein, said transparent means being adapted to extend over the openings to close or regulate the extent of the openings in said member as described.

7. In a guard cage comprising three tubular members, means for connecting the tubular members, the intermediate member being flared to permit viewing the area beneath and surrounding the cage and having openings provided therein and slidable transparent closure members movably secured to the intermediate member to close or partially close the openings.

8. In a guard cage, a tubular member having an enlarged upper portion and smaller lower portion, said tubular member having the intermediate portion thereof inclined with openings formed therein to permit viewing the area beneath and surrounding the cage, in combination with slidable transparent members which are arranged to cover or partially cover the openings formed in the inclined portion as described and set forth.

In testimony whereof I affix my signature.

EDWARD A. BAKER.